United States Patent
Nagasamy et al.

(10) Patent No.: US 6,169,958 B1
(45) Date of Patent: Jan. 2, 2001

(54) IONOSPHERIC CORRECTION FOR SINGLE FREQUENCY GPS RECEIVERS USING THREE SATELLITES

(75) Inventors: Vijay Nagasamy, Fremont; Mohammad Usman, Santa Clara; James Sun, Mountain View, all of CA (US)

(73) Assignee: VSIS, Inc., Sunnyvale, CA (US)

( * ) Notice: Under 35 U.S.C. 154(b), the term of this patent shall be extended for 0 days.

(21) Appl. No.: 09/289,552

(22) Filed: Apr. 9, 1999

(51) Int. Cl.$^7$ .................................................. G06F 165/00

(52) U.S. Cl. .................. 701/213; 701/214; 701/226; 701/300; 342/357.01; 342/357.06; 342/357.09

(58) Field of Search ................................. 701/207, 213, 701/214, 215, 216, 221, 224, 225, 226, 300; 342/357.01, 357.02, 357.03, 357.06, 357.08, 357.09

(56) References Cited

U.S. PATENT DOCUMENTS

| | | | |
|---|---|---|---|
| 5,210,540 | 5/1993 | Masumoto | 342/357.11 |
| 5,430,654 | 7/1995 | Kyrtsos et al. | 701/215 |
| 5,506,587 | * 4/1996 | Lans | 342/357.09 |
| 5,825,326 | * 10/1998 | Semler et al. | 342/357.04 |
| 5,831,545 | * 11/1998 | Murray et al. | 340/825.49 |
| 5,999,878 | * 12/1999 | Hanson et al. | 701/208 |
| 6,032,108 | * 2/2000 | Seiple et al. | 702/97 |

OTHER PUBLICATIONS

Klobuchar, John A., Air Force Geophysics Laboratory, Ionospheric Effects on GPS, GSP World, Apr. 1991, pp. 48–51.

Wu, B., et al.,*Mayflower Communications Co., Inc.* and T.R. Jenkins, *Wright Laboratory*, WPAFB, Ionospheric Error Compensation for GPS Receivers Using Real–Time Ionospheric Model, pp. 575–583.

Beser, Jacques and Balendra, Anushia, *3S Navigation*, Enhanced Ionospheric Delay Compensation Using GLONASS, pp. 1609–1617.

Lin, Lao–Sheng, *School of Geomatic Engineering, The University of New South Wales*, "A Novel Approach to Improving the Accuracy of Real–Time Ionospheric Delay Estimation Using GPS", pp. 169–178.

Robert E. Daniell, Jr., et al., *Computational Physics, Inc.*, "A New, Improved Ionospheric Correction Algorithm for Single Frequency GPS Receivers," pp. 635–640.

Zhao, Yilin, "Vehicle Location and Navigation Systems," Section, 3.4.2 Global Positioning System, pp. 63–75, ISBN 0–89006–861–5, (alk.paper); TE228.3Z45, 1997, Library of Congress Card No. 97–4200; Artech House, Inc., Norwood, MA 02062,.

Christie, Jock R.I., et al., Department of Aeronautics and Astronautics, *Stanford University*, The Effects of the Ionosphere and C/A Frequency on GPS Signal Shape: Considerations for GNSS–2, The Effects of the Onosphere and C/A Frequency on GPS Signal Shape: Considerations for GNSS–2, pp. 647–653.

\* cited by examiner

Primary Examiner—William A. Cuchlinski, Jr.
Assistant Examiner—Gertrude Arthur
(74) Attorney, Agent, or Firm—Lyon & Lyon LLP

(57) ABSTRACT

Systems and methods are disclosed for ionospheric correction in a system employing a single GPS frequency receiver for determining the geographic location of an object on the earth's surface. The receiver receives signals transmitted at the GPS $L_1$ frequency from at least first, second and third GPS satellites, the first, second and third satellites having respective orbital positions relative to the receiver such that the total electron count (TEC) contribution to ionoshperic interference to signals transmitted by the respective satellites and received by the receiver is approximately the same. Respective measured distances of the three satellites to the receiver are determined based on the actual signal transmission times. True distances of the respective satellites are then calculated based on the assumption that the TEC contribution to the interference from each satellite is approximately the same.

9 Claims, 1 Drawing Sheet

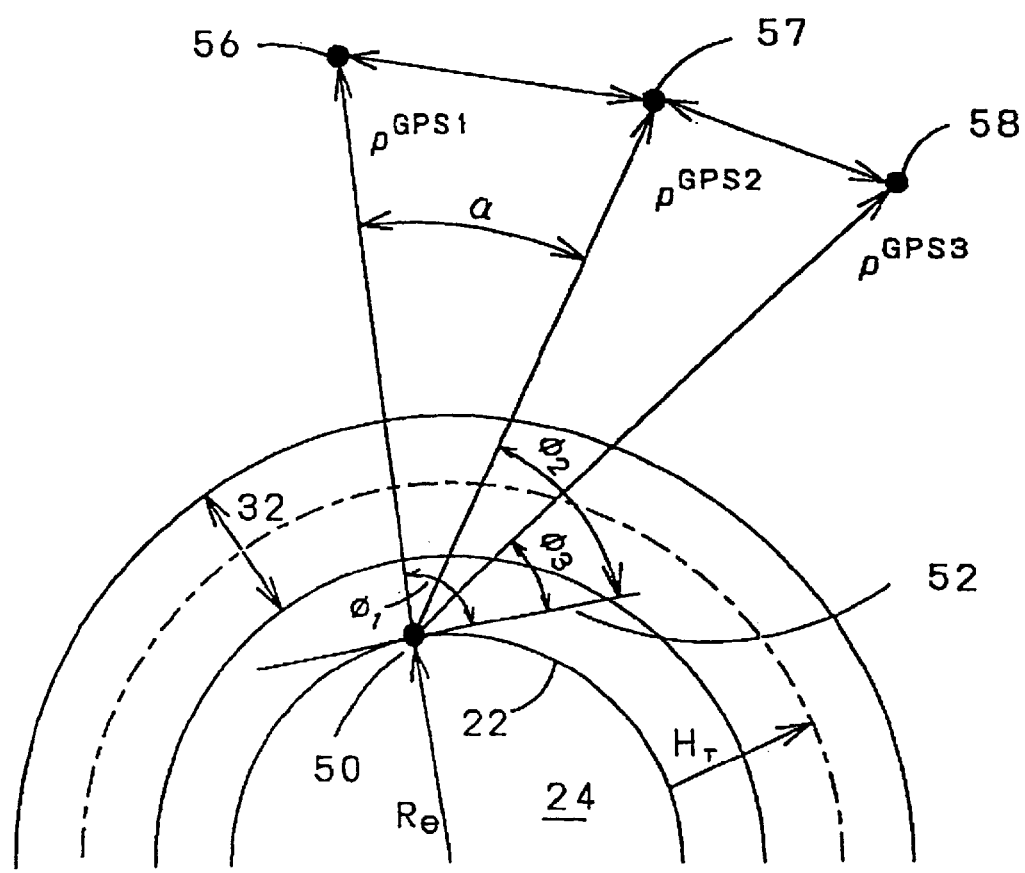

IONOSPHERIC CORRECTION FOR SINGLE FREQUENCY GPS RECEIVERS USING THREE SATELLITES

FIELD OF THE INVENTION

The present invention pertains generally to the field of locating systems employing GPS satellites, and more specifically to methods and apparatus for ionospheric correction in a locating system employing a single frequency GPS receiver.

BACKGROUND OF THE INVENTION

Satellite-based global positioning systems are well known. For example, U.S. Pat. No. 5,210,540 (the "'540 patent"), issued to Masumota discloses a global positioning system for locating a mobile object, such as an automobile, in a global geometrical region. As described therein, the system includes a Global Positioning System (GPS) receiver for receiving radio waves from a plurality of satellites and outputting either two or three dimensional position data indicative of the present position of the mobile object. For greater accuracy, an altimeter is also employed to detect the mobile object's relative altitude. U.S. Pat. No. 5,430,654 (the "'654 patent"), issued to Kyrtsos et al discloses apparatus and methods for determining the position of a vehicle at, or near the surface of the earth using a satellite-based navigation system, wherein "precise" position estimates are achieved by reducing the effective receiver noise. The respective '540 and '654 patents are incorporated herein by reference for all they disclose and teach.

In particular, the Global Positioning System is a satellite-based navigation system that was designed and paid for by the U.S. Department of Defense. The GPS consists of twenty-four satellites, which orbit the earth at known coordinates. The particulars of the GPS are described in section 3.4.2 of "Vehicle Location and Navigation Systems," by Yilin Zhao, Artech House, Inc., 1997, which is fully incorporated herein by reference. As noted therein, the observation of at least four GPS satellites simultaneously will permit determination of three-dimensional coordinates of a receiver located on the earth's surface, as well as the time offset between the receiver and the respective satellites.

One problem encountered in global positioning systems is ionospheric interference. The ionosphere is a dispersive medium, which lies between seventy and one thousand kilometers above the earth's surface. The ionosphere effects a certain, frequency dependent propagation delay on signals transmitted from the respective GPS satellites. The ionosphere also effects GPS signal tracking by the receiver. Notably, the ionospheric delay of a transmitted GPS signal can cause an error of up to ten meters when calculating the exact geographic position on the earth's surface of the receiver.

As demonstrated below, delay from ionospheric interference can be almost completely corrected for by using multiple frequency observations, i.e., by transmitting and receiving signals at two different, known GPS frequencies, $L_1$ and $L_2$, from a respective satellite. However, for security reasons, most GPS receivers do not receive the $L_2$ frequency. Instead, these single (i.e., $L_1$) frequency receivers can employ a model to estimate and correct for transmission delay due to ionospheric interference.

For example, the Global Positioning System, Interface Control Document, ICD-GPS-200, Revision C, Initial Release, Oct. 10, 1993, provides a method for ionospheric correction based on an "approximate atmospheric" model, which is dependent on a "total electron content" (TEC) model. In accordance with this model, and using only the $L_1$ signal transmission frequency, it can be shown that the error $\Delta S_1$ in the true satellite to receiver/user distance $\rho$ is:

$$\Delta S_1 = F_{pp} 40.3 \frac{TEC}{L_1^2} \quad (1)$$

where $F_{pp}$, is an "obliquity factor":

$$F_{pp} = \left(\left[1 - \left(\frac{R_e \cos\phi}{R_e + H_r}\right)^2\right]\right)^{-\frac{1}{2}} \quad (2)$$

where $R_e$ is the radius of the earth, $H_r$ is the height of the maximum electron density in the ionosphere from the earth's surface, and $\phi$ is the angle between the respective satellite and a plane tangent to the earth's surface at the receiver's position.

Notably, the true TEC value of the ionosphere is very difficult to model and is highly sensitive to variables, such as time of day, solar activity and relative incident angle of the satellite with respect to the sunlight trajectory (if any) toward the receiver location, etc. In particular, the TEC nominal value varies widely, within a range of between $10^{16}$ to $10^{19}$. As a result, the above ionospheric correction model has been shown to adequately correct for no more than 50% of the ionospheric transmission delay.

As noted above, a dual frequency receiver can virtually eliminate ionospheric errors by computing the pseudo-range distance of the respective satellite on both the $L_1$ and $L_2$ frequencies. For purposes of illustration, a short derivation of such a dual frequency correction methodology is as follows:

Let $\Delta S_1$ and $\Delta S_2$ represent the error in the pseudo-range distances computed at frequencies $L_1$ and $L_2$, respectively. Then:

$$\Delta S_1 = -F_{pp} 40.3 \frac{TEC}{L_1^2} = \lambda_{L_1} - \rho \quad (3)$$

and $$\Delta S_2 = -F_{pp} 40.3 \frac{TEC}{L_2^2} = \lambda_{L2} - \rho \quad (4)$$

where $\lambda_{L1}$ and $\lambda_{L2}$ are the respective pseudo-range distances computed at frequencies $L_1$ and $L_2$, respectively, and $\rho$ is the true satellite to receiver distance. Dividing equation (3) by equation (4), results in:

$$\frac{\Delta S_1}{\Delta S_2} = \frac{L_2^2}{L_1^2} \quad (5)$$

Subtracting equation (4) from equation (3), gives:

$$\Delta S_1 - \Delta S_2 = \lambda_{L1} - \lambda_{L2} \quad (6)$$

Substituting equation (5) into equation (6), and after some minor algebraic manipulation, provides:

$$\Delta S_1 = \left(\frac{L_2^2}{L_1^2 - L_1^2}\right)(\lambda_{L_2} - \lambda_{L_1}) \tag{7}$$

Importantly, all quantities in the above expression (7) are either known by the receiver, or can be measured, with the TEC value totally canceled out of the equation.

Of course, in a GPS-based locating system having only a single (i.e., $L_1$) frequency receiver, the above-described ionospheric correction model based on both the $L_1$ and $L_2$ transmission frequencies can not be employed.

SUMMARY OF THE INVENTION

The present invention is directed to satellite-based systems and methods for correcting for ionospheric interference in a single-frequency receiver system for determining the geographic location of an object on the earth's surface without requiring ionospheric TEC modeling.

In accordance with one aspect of the invention, a method using satellite signal transmission for determining the geographic location of a receiver on the earth's surface, includes:

receiving a first signal transmitted at a known frequency from a first satellite having a known orbital position;

receiving a second signal transmitted at the same frequency as the first signal from a second satellite having a known orbital position;

receiving a third signal transmitted at the same frequency as the first signal from a third satellite having a known orbital position;

calculating measured distances $\lambda^1$, $\lambda^2$ and $\lambda^3$ of the respective first, second and third satellites from the receiver based at least in part on the transmission time of the third signal; and calculating actual distances $\rho^1$, $\rho^2$ and $\rho^3$ of the respective first, second and third satellites from the receiver based on the measured distances $\lambda^1$, $\lambda^2$ and $\lambda^3$, according to the relationships $$\frac{F_{pp}^1}{F_{pp}^2}(\lambda^2 - \rho^2) = \lambda^1 - \rho^1,$$

$$\frac{F_{pp}^1}{F_{pp}^3}(\lambda^3 - \rho^3) = \lambda^1 - \rho^1, \text{ and}$$

$$\frac{F_{pp}^2}{F_{pp}^3}(\lambda^3 - \rho^3) = \lambda^2 - \rho^2,$$

where $F_{pp}^1$, $F_{pp}^2$, and $F_{pp}^3$ are obliquity factors for the respective first, second and third satellites based on the respective angles $\phi_1$, $\phi_2$ and $\phi_3$ they form with a plane tangent to the earth's surface at the geographic location of the receiver, with $$F_{pp}^1 = -\left[1 - \left(\frac{R_e \cos\phi_1}{R_e + H_r}\right)^2\right]^{-\frac{1}{2}},$$

$$F_{pp}^2 = -\left[1 - \left(\frac{R_e \cos\phi_2}{R_e + H_r}\right)^2\right]^{-\frac{1}{2}}, \text{ and}$$

-continued $$F_{pp}^3 = \left[1 - \left(\frac{R_e \cos\phi_3}{R_e + H_r}\right)^2\right]^{-\frac{1}{2}},$$

where $R_e$ is the radius of the earth and $H_r$ is the height of maximum electron density in the ionosphere surrounding the earth's surface.

As will be apparent to those skilled in the art, other and further aspects and advantages of the present invention will appear hereinafter.

BRIEF DESCRIPTION OF THE DRAWINGS

Preferred embodiments of the present invention are illustrated by way of example, and not by way of limitation, in the accompanying drawing, in which:

FIG. 1 is a diagrammatic illustration of a GPS-based locating system for locating the geographic position of a single frequency GPS receiver on the earth's surface.

DETAILED DESCRIPTION OF THE PREFERRED EMBODIMENTS

An exemplary GPS-based locating system is illustrated in FIG. 1. For ease in illustration of the present inventions disclosed and described herein, only three satellites and a single receiver are shown in the locating system. It is assumed that the timing offset between the respective satellites and receiver is either already known or otherwise calculated by use of an additional satellite (not shown).

In particular, a GPS receiver 50 is at a particular location on the surface 22 of the earth 24, e.g., within an object to be located. A first GPS satellite 56 is located above the earth's atmosphere at an angle $\phi_1$ between the satellite 56 and a plane 52 tangent to the earth's surface 22 at the geographic location of the GPS receiver 50. The actual distance between the first satellite 56 and the receiver 50 is designated as $\rho^{GPS1}$. Likewise, a second GPS satellite 57 is located above the earth's atmosphere at an angle $\phi_2$ formed between satellite 57 and plane 52, with the actual distance between the second satellite 57 and the receiver 50 designated as $\rho^{GPS2}$. A third GPS satellite 58 is located above the earth's atmosphere at an angle $\phi_3$ formed between satellite 58 and plane 52, with the actual distance between the third satellite 58 and the receiver 50 designated as $\rho^{GPS3}$. Although the GPS satellites 56, 57 and 58 broadcast at both the $L_1$ and $L_2$ frequencies, in accordance with the inventions disclosed herein, it is assumed that only the $L_1$ frequency is received by the receiver 50. Notably, the respective $L_1$ signals travel through the earth's ionosphere 32 before they reach the GPS receiver 50.

More particularly, the ionospheric TEC is mainly a function of the time of day, solar activities, and relative position of the satellite relative to the respective sunlight trajectory (if any) towards the receiver 50. Thus, at a given instant while satellites 56, 57 and 58 are in orbit over the receiver 50, the ionospheric TEC value for each satellite is approximately the same. Based on signal transmission measurements taken from each satellite 56, 57 and 58 at the same time of day and, thus, with the same solar activity, the only variable is the particular relative location of each satellite with respect to the receiver 50.

In a preferred embodiment, the respective satellites 56, 57 and 58 are selected for making a location calculation by the receiver 50 based on their relative proximity in space to each other, thereby increasing the likelihood that the respective nominal TEC values for each satellite can be assumed to be approximately the same.

Accordingly, from above equation (1), the respective errors due to ionospheric interference in the true satellite to receiver distances $\rho^{GPS1}$, $\rho^{GPS2}$ and $\rho^{GPS3}$ are as follows:

$$\Delta S_1 = -F_{pp}^{GPS1} 40.3 \frac{TEC}{L_1^2} = \lambda_{L1}^{GPS1} - \rho^{GPS1} \quad (8)$$

$$\Delta S_2 = -F_{pp}^{GPS2} 40.3 \frac{TEC}{L_1^2} = \lambda_{L1}^{GPS2} - \rho^{GPS2} \quad (9)$$

and $$\Delta S_3 = -F_{pp}^{GPS3} 40.3 \frac{TEC}{L_1^2} = \lambda_{L1}^{GPS3} - \rho^{GPS3} \quad (10)$$

where $\lambda_{L1}^{GPS1}$, $\lambda_{L1}^{GPS2}$, $\lambda_{L1}^{GPS3}$ are the measured pseudo-range distances between the respective satellites 56, 57 and 58 and the receiver 50, and where $F_{pp}^{GPS1}$, $F_{pp}^{GPS2}$, and $F_{pp}^{GPS3}$ are the obliquity factors for satellites 56, 57 and 58 based on the respective angles $\phi_1$, $\phi_2$ and $\phi_3$ they form with the tangent plane 52. Following from equation (2):

$$F_{pp}^{GPS1} = -\left[1 - \left(\frac{R_e \cos\phi_1}{R_e + H_r}\right)^2\right]^{-\frac{1}{2}} \quad (11)$$

$$F_{pp}^{GPS2} = -\left[1 - \left(\frac{R_e \cos\phi_2}{R_e + H_r}\right)^2\right]^{-\frac{1}{2}} \quad (12)$$

and $$F_{pp}^{GPS3} = \left[1 - \left(\frac{R_e \cos\phi_3}{R_e + H_r}\right)^2\right]^{-\frac{1}{2}} \quad (13)$$

where $R_e$ is the radius of the earth, $H_r$ is the height of the maximum electron density in the ionosphere from the earth's surface, which are known to the receiver 50.

Considering the relationship between the first two satellites 56 and 57, and dividing equation (8) by equation (9):

$$\frac{F_{pp}^{GPS1}}{F_{pp}^{GPS2}} = \frac{\lambda_{L1}^{GPS1} - \rho^{GPS1}}{\lambda_{L1}^{GPS2} - \rho^{GPS2}} \quad (14)$$

Rearranging:

$$\frac{F_{pp}^{GPS1}}{F_{pp}^{GPS2}}(\lambda_{L1}^{GPS2} - \rho^{GPS2}) = \lambda_{L1}^{GPS1} - \rho^{GPS1} \quad (15)$$

By the same approach, it follows that:

$$\frac{F_{pp}^{GPS1}}{F_{pp}^{GPS3}}(\lambda_{L1}^{GPS3} - \rho^{GPS3}) = \lambda_{L1}^{GPS1} - \rho^{GPS1} \quad (16)$$

and $$\frac{F_{pp}^{GPS2}}{F_{pp}^{GPS3}}(\lambda_{L1}^{GPS3} - \rho^{GPS3}) = \lambda_{L1}^{GPS2} - \rho^{GPS2} \quad (17)$$

Thus, the three equations (15), (16) and (17) contain only three unknowns $\rho^{GPS1}$, $\rho^{GPS2}$ and $\rho^{GPS3}$, whereby the true geographic location on the earth's surface 22 of the receiver 50 may be readily determined from the respective measured pseudo range distances of the three satellites 56, 57 and 58 at the receiver 50. Notably, the solution will not depend on the respective TEC values.

Alternatively, correction for ionospheric interference may be done by measuring signals from just two satellites, e.g., 56 and 57.

Because the exact orbit position coordinates of the satellites 56 and 57 (and, thus $\phi_1$, and $\phi_2$) are known to the receiver 50, the actual distance $\rho^{GPS1-2}$ between the two satellites can be calculated as follows:

$$\rho^{GPS1-2} = \sqrt{(x^{GPS1} - x^{GPS2})^2 + (y^{GPS1} - y^{GPS2})^2 + (z^{GPS1} - z^{GPS2})^2} \quad (19)$$

where $(x^{GPS1}, y^{GPS1}, z^{GPS1})$ are the coordinates in space of satellite 56, and $(x^{GPS2}, y^{GPS2}, z^{GPS2})$ are the coordinates in space of satellite 57.

Referring again to FIG. 2, and considering the triangle formed by $\rho^{GPS1-2}$, $\rho^{GPS1}$ and $\rho^{GPS2}$:

$$(\rho^{GPS1-2})^2 = (\rho^{GPS1})^2 + (\rho^{GPS2})^2 - 2\cdot\rho^{GPS1}\cdot\rho^{GPS2}\cdot\cos\alpha \quad (20)$$

where $\alpha$ is the angle between $\rho^{GPS1}$ and $\rho^{GPS2}$.

Letting $\beta$ be the "measured angle" between $\lambda_{L1}^{GPS1}$ and $\lambda_{L1}^{GPS2}$, since $\lambda_{L1}^{GPS1} - \rho^{GPS1} << \lambda_{L1}^{GPS1}$ and $\lambda_{L1}^{GPS2} - \rho^{GPS2} << \lambda_{L1}^{GPS2}$, it is reasonable to assume $\cos\alpha$ is approximately equal to $\cos\beta$. Therefore, equation (20) can be rewritten as $$(\rho^{GPS1-2})^2 = (\rho^{GPS1})^2 + (\rho^{GPS2})^2 - 2\cdot\rho^{GPS1}\cdot\rho^{GPS2}\cdot\cos\beta \quad (21)$$

Thus, the two equations, (21) and (15) contain only two unknowns, $\rho^{GPS1}$ and $\rho^{GPS2}$, whereby the true geographic location on the earth's surface 22 of the receiver 50 may be readily determined from the respective measured pseudo range distances $\lambda_{L1}^{GPS1}$ and $\lambda_{L1}^{GPS2}$ of satellites 56 and 57, and, thus, the measured angle Ø formed by satellites 56 and 57 with respect to the receiver 50. Again, the solution will not depend on the respective TEC values.

As will be apparent to those skilled in the art, the above methods for ionospheric correction may also be applied to a GLONASS, or combined GPS/GLONASS receiver, so long as the respective transmission timing, frequency and orbit coordinates are known by the receiver for each respective satellite.

While preferred systems and methods for correcting for ionospheric interference in a single frequency GPS receiver system have been shown and described, as would be apparent to those skilled in the art, many modifications and applications are possible without departing from the inventive concepts herein. Thus, the scope of the disclosed invention is not to be restricted except in accordance with the appended claims.

What is claimed is:

1. A method using satellite signal transmission for determining the geographic location of a receiver on the earth's surface, comprising:

receiving a first signal transmitted at a known frequency from a first satellite having a known orbital position;

receiving a second signal transmitted at the same frequency as the first signal from a second satellite having a known orbital position;

receiving a third signal transmitted at the same frequency as the first signal from a third satellite having a known orbital position;

calculating measured distances $\lambda^1$, $\lambda^2$ and $\lambda^3$ of the respective first, second and third satellites from the receiver based at least in part on the transmission time of the respective first, second and third signals; and calculating actual distances $\rho^1$, $\rho^2$ and $\rho^3$ of the respective first, second and third satellites from the receiver based on the measured distances $\lambda^1$, $\lambda^2$ and $\lambda^3$, according to the relationships $$\frac{F_{pp}^1}{F_{pp}^2}(\lambda^2 - \rho^2) = \lambda^1 - \rho^1,$$

$$\frac{F_{pp}^1}{F_{pp}^3}(\lambda^3 - \rho^3) = \lambda^1 - \rho^1, \text{ and}$$

$$\frac{F_{pp}^2}{F_{pp}^3}(\lambda^3 - \rho^3) = \lambda^2 - \rho^2,$$

where $F_{pp}^1$, $F_{pp}^2$, and $F_{pp}^3$ are obliquity factors for the respective first, second and third satellites based on the respective angles $\phi_1$, $\phi_2$ and $\phi_3$ they form with a plane tangent to the earth's surface at the geographic location of the receiver, with $$F_{pp}^1 = -\left[1 - \left(\frac{R_e \cos\phi_1}{R_e + H_r}\right)^2\right]^{-\frac{1}{2}},$$

$$F_{pp}^2 = -\left[1 - \left(\frac{R_e \cos\phi_2}{R_e + H_r}\right)^2\right]^{-\frac{1}{2}}, \text{ and}$$

$$F_{pp}^3 = \left[1 - \left(\frac{R_e \cos\phi_3}{R_e + H_r}\right)^2\right]^{-\frac{1}{2}},$$

where $R_e$ is the radius of the earth and $H_r$ is the height of maximum electron density in the ionosphere surrounding the earth's surface.

2. The method of claim 1, wherein the first second and third satellites are global positioning system (GPS) satellites.

3. The method of claim 2, wherein the first second and third signals are transmitted at the GPS $L_1$ signal frequency.

4. The method of claim 1, wherein the first, second and third satellites have respective orbital positions relative to the receiver such that the total electron count (TEC) contribution to ionoshperic interference to the transmission of the first, second and third signals is approximately the same.

5. A system for determining the geographic location of objects on the earth's surface, comprising:

a receiver configured to receive signals transmitted at a selected frequency from first, second and third satellites having known orbital positions, the receiver further configured to calculate measured distances $\lambda^1$, $\lambda^2$ and $\lambda^3$ of the respective first, second and third satellites from the receiver based at least in part on the transmission time of the received signals, and calculate actual distances $\rho^1$, $\rho^2$ and $\rho^3$ of the respective first, second and third satellites from the receiver based on the measured distances $\lambda^1$, $\lambda^2$ and $\lambda^3$, according to the relationships $$\frac{F_{pp}^1}{F_{pp}^2}(\lambda^2 - \rho^2) = \lambda^1 - \rho^1,$$

$$\frac{F_{pp}^1}{F_{pp}^3}(\lambda^3 - \rho^3) = \lambda^1 - \rho^1, \text{ and}$$

$$\frac{F_{pp}^2}{F_{pp}^3}(\lambda^3 - \rho^3) = \lambda^2 - \rho^2,$$

where $F_{pp}^1$, $F_{pp}^2$, and $F_{pp}^3$ are obliquity factors for the respective first, second and third satellites based on the respective angles $\phi_1$, $\phi_2$ and $\phi_3$ they form with a plane tangent to the earth's surface at the geographic location of the receiver, with $$F_{pp}^1 = -\left[1 - \left(\frac{R_e \cos\phi_1}{R_e + H_r}\right)^2\right]^{-\frac{1}{2}},$$

$$F_{pp}^2 = -\left[1 - \left(\frac{R_e \cos\phi_2}{R_e + H_r}\right)^2\right]^{-\frac{1}{2}}, \text{ and}$$

$$F_{pp}^3 = \left[1 - \left(\frac{R_e \cos\phi_3}{R_e + H_r}\right)^2\right]^{-\frac{1}{2}},$$

where $R_e$ is the radius of the earth and $H_r$ is the height of maximum electron density in the ionosphere surrounding the earth's surface.

6. The system of claim 5, wherein the first second and third satellites are global positioning system (GPS) satellites.

7. The system of claim 6, wherein the first second and third signals are transmitted at the GPS $L_1$ signal frequency.

8. The system of claim 5, wherein the first, second and third satellites have respective orbital positions relative to the receiver such that the total electron count (TEC) contribution to ionoshperic interference to the transmission of the first, second and third signals is approximately the same.

9. A system for determining the geographic location of objects on the earth's surface, comprising:

a single frequency global positioning system (GPS) receiver configured to receive signals transmitted at the GPS $L_1$ frequency from first, second and third GPS satellites, the respective receiver and satellites having synchronized clocks, the first, second and third satellites having respective orbital positions relative to the receiver such that the total electron count (TEC) contribution to ionoshperic interference to signals transmitted by the respective satellites and received by the receiver is approximately the same, the receiver further configured to calculate measured distances $\lambda^1$, $\lambda^2$ and $\lambda^3$ of the respective first, second and third satellites from the receiver based at least in part on the transmission time of the received signals, and calculate actual distances $\rho^{GPS1}$, $\rho^{GPS2}$ and $\rho^{GPS3}$ of the respective first, second and third satellites from the receiver based on the measured distances $\lambda_{L1}^{GPS1}$, $\lambda_{L1}^{GPS2}$ and $\lambda_{L1}^{GPS3}$ according to the relationships $$\frac{F_{pp}^{GPS1}}{F_{pp}^{GPS2}}(\lambda_{L_1}^{GPS2} - \rho^{GPS2}) = \lambda_{L_1}^{GPS1} - \rho^{GPS1},$$

$$\frac{F_{pp}^{GPS1}}{F_{pp}^{GPS3}}(\lambda_{L_1}^{GPS3} - \rho^{GPS3}) = \lambda_{L_1}^{GPS1} - \rho^{GPS1}, \text{ and}$$

$$\frac{F_{pp}^{GPS2}}{F_{pp}^{GPS3}}(\lambda_{L_1}^{GPS3} - \rho^{GPS3}) = \lambda_{L_1}^{GPS2} - \rho^{GPS2},$$

where $F_{pp}^{GPS1}$, $F_{pp}^{GPS2}$, and $F_{pp}^{GPS3}$ are obliquity factors for the respective first, second and third satellites based on the respective angles $\phi_1$, $\phi_2$ and $\phi_3$ they form with a plane tangent to the earth's surface at the geographic location of the receiver, with $$F_{pp}^{GPS1} = -\left[1 - \left(\frac{R_e\cos\phi_1}{R_e + H_r}\right)^2\right]^{-\frac{1}{2}},$$

$$F_{pp}^{GPS2} = -\left[1 - \left(\frac{R_e\cos\phi_2}{R_e + H_r}\right)^2\right]^{-\frac{1}{2}}, \text{ and}$$

$$F_{pp}^{GPS3} = \left[1 - \left(\frac{R_e\cos\phi_3}{R_e + H_r}\right)^2\right]^{-\frac{1}{2}},$$

where $R_e$ is the radius of the earth and $H_r$ is the height of maximum electron density in the ionosphere surrounding the earth's surface.

\* \* \* \* \*